US010187512B2

(12) United States Patent
Singh et al.

(10) Patent No.: US 10,187,512 B2
(45) Date of Patent: Jan. 22, 2019

(54) VOICE-TO TEXT MODE BASED ON AMBIENT NOISE MEASUREMENT

(71) Applicant: Apple Inc., Cupertino, CA (US)

(72) Inventors: Ajoy K. Singh, Milpitas, CA (US); Raj S. Chaugule, Santa Clara, CA (US); Sanjay K. Verma, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/611,978

(22) Filed: Jun. 2, 2017

(65) Prior Publication Data

US 2018/0091643 A1 Mar. 29, 2018

Related U.S. Application Data

(60) Provisional application No. 62/400,438, filed on Sep. 27, 2016.

(51) Int. Cl.

| | |
|---|---|
| *H04B 1/38* | (2015.01) |
| *H04M 1/725* | (2006.01) |
| *H04W 4/14* | (2009.01) |
| *H04M 3/42* | (2006.01) |
| *G10L 15/26* | (2006.01) |
| *G10L 25/84* | (2013.01) |
| *G06F 3/0481* | (2013.01) |
| *G06F 3/0484* | (2013.01) |
| *H04M 3/00* | (2006.01) |
| *H04M 1/00* | (2006.01) |
| *H04W 88/08* | (2009.01) |

(Continued)

(52) U.S. Cl.
CPC .... *H04M 1/72569* (2013.01); *G06F 3/04817* (2013.01); *G06F 3/04842* (2013.01); *G10L 15/265* (2013.01); *G10L 25/84* (2013.01); *H04M 3/42391* (2013.01); *H04W 4/14* (2013.01); *G10L 2025/783* (2013.01); *H04M 1/6008* (2013.01); *H04M 2250/74* (2013.01); *H04W 88/08* (2013.01)

(58) Field of Classification Search
CPC ......... H04W 4/00–4/029; H04W 4/18; H04W 4/30; H04W 4/33; H04W 4/38; H04W 4/42; H04W 4/44; H04W 4/46; H04W 4/48
See application file for complete search history.

(56) References Cited

U.S. PATENT DOCUMENTS

| | | | | |
|---|---|---|---|---|
| 5,960,366 A | * | 9/1999 | Duwaer | G04G 21/04 368/13 |
| 7,359,714 B2 | | 4/2008 | Parupudi et al. | |
| 9,275,642 B2 | | 5/2016 | Abdossalami et al. | |

(Continued)

FOREIGN PATENT DOCUMENTS

WO WO 2016/113693 7/2016

*Primary Examiner* — San Htun
(74) *Attorney, Agent, or Firm* — Meyertons Hood Kivlin Kowert & Goetzel, P.C.; Jeffrey C. Hood

(57) ABSTRACT

Some embodiments relate to a smart phone or a wearable device, such as a smart watch, and associated methods for enabling the UE device to switch from a normal mode to/from a voice-to-text mode and/or a text-to-voice mode. The transition to/from voice-to-text mode and/or text-to-voice mode may be conducted automatically or through manual selection by the user of the UE. These transitions (or the presentation of a manual selection option) may be determined based on an ambient noise measurement performed by the UE.

20 Claims, 11 Drawing Sheets

(51) Int. Cl.
　　　*G10L 25/78*　　　(2013.01)
　　　*H04M 1/60*　　　(2006.01)

(56) References Cited

U.S. PATENT DOCUMENTS

| | | | |
|---|---|---|---|
| 2003/0097262 A1* | 5/2003 | Nelson | H04M 1/72522 704/235 |
| 2005/0154586 A1* | 7/2005 | Liu | H04M 3/42 704/235 |
| 2006/0217159 A1* | 9/2006 | Watson | H04M 1/72522 455/563 |
| 2007/0190944 A1* | 8/2007 | Doan | H04M 1/72569 455/63.1 |
| 2009/0299743 A1* | 12/2009 | Rogers | H04M 1/274516 704/235 |
| 2010/0057466 A1* | 3/2010 | Garg | H04M 1/72544 704/260 |
| 2013/0053007 A1* | 2/2013 | Cosman | G06F 3/017 455/414.3 |
| 2017/0031556 A1 | 2/2017 | Yang et al. | |

\* cited by examiner

VOICE-TO TEXT MODE BASED ON AMBIENT NOISE MEASUREMENT

PRIORITY CLAIM

The present application claims benefit of priority to U.S. Provisional Application No. 62/400,438 titled "User Equipment Device Interactive Communication", filed Sep. 27, 2016, which is hereby incorporated by reference in its entirety as though fully and completely set forth herein.

FIELD

The present application relates to wireless communication, including providing improved interactive communication capabilities for a small form factor device, such as a smart phone or wearable device (e.g., a smart watch).

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets, which users often carry on their person or hold. Smaller form factor devices, such as smart watches, are a newer form of mobile electronic device. These and other devices which are designed to be worn by the user may be referred to as wearable devices. In the past, the wireless communications capabilities of wearable devices have been generally limited; for example, some wearable devices have been capable of communicating only through wired interfaces or over short-range point-to-point technologies. Moreover, wearable devices typically have smaller batteries and more limited input and output capabilities than larger portable devices such as smart phones and tablets.

A wearable electronic device is obviously worn most of the time during use. As a result, a user can encounter privacy issues during voice communication in situations where a headset (typically a Bluetooth headset) or other type of input/output (I/O) accessory is not being used. It would be desirable to provide interactive communications capabilities for wearable devices while maintaining privacy of voice calls, e.g., in public locations. It would further be desirable to provide improved communication capabilities for hearing impaired and other differently-abled individuals. Thus, improvements in the field are desirable.

SUMMARY

Embodiments are presented herein of, inter alia, a user equipment (UE) device, which may be a smart phone or a wearable device, such as a smart watch, and associated methods for enabling the UE device to switch from a normal mode to/from a voice-to-text mode and/or a text-to-voice mode. In the voice-to-text mode, an incoming voice call may be presented to the user by the UE via text messaging, and in the text-to-voice mode text messaging and/or email may be presented to the user by the UE via audio. The transition to/from voice-to-text mode and/or text-to-voice mode may be conducted automatically or through manual selection by the user of the UE. The transitions (or the presentation of a manual selection option) may be determined based on the proximity of a companion wireless device for supplemental audio I/O, such as the proximity of a companion smart phone device or the availability of an audio headset when the UE is a wearable device. The transitions may also, or instead, be based on a variety of other factors, such as a measurement of the amount of ambient noise where the UE is located, the location of the UE, whether the user of the UE is driving a vehicle, power status of the UE, and/or user preference, as well as others.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
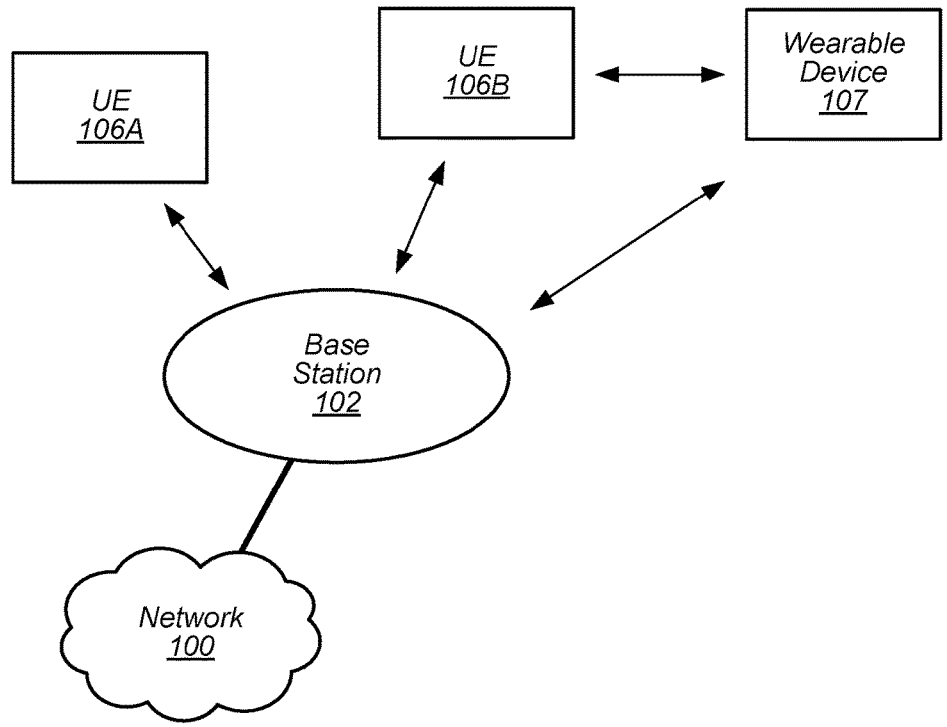
FIG. 1 illustrates an example wireless communication system including a wearable device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as a small form factor device, which as an example may be a wearable device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA). The base station 102 (or similar network infrastructure) may also support other communication technologies, such as text messaging, e.g., SMS (Short Message Service) and similar text messaging technologies, such as iMessage, Facebook Messenger, Whatsapp, etc.

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc. One example of LTE or LTE-A communications may be VoLTE (Voice over LTE).

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, WLAN (Wi-Fi), Bluetooth, WiMAX, one or more global navigational satellite systems (GNSS, e.g., GPS or GLONASS), one and/or more mobile television broadcasting standards (e.g., ATSC-M/H), SMS, etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with communication capability, such as cellular communications capability. The UE 106B may be configured to communicate with the UE device 107, which may be referred to as a small form factor device or wearable device 107. The wearable device 107 may be any of various types of devices. Typically a wearable device that has a smaller form factor, and may have limited battery, output power and/or communications abilities relative to UEs 106. As one common example, the UE 106B may be a smart phone carried by a user, and the wearable device 107 may be a smart watch worn by that same user, or possibly a different user. Thus, as another example, in the operation described herein the UE 106B may be a smart phone carried by a first user, and the wearable device 107 may be a smart watch worn by a second, different user. The UE 106B and the wearable device 107 may communicate using any of various short-range communication protocols, such as Bluetooth, Wi-Fi, etc.

The wearable device 107 may include communications capability, e.g., cellular communication capability, and hence may be able to directly communicate with cellular base station 102. However, since the wearable device 107 is possibly limited in one or more of its communication capabilities, output power, and/or battery, the wearable device 107 may in some instances selectively utilize the UE 106B as a proxy for communication purposes with the base station 102 and hence to the network 100. In other words, the wearable device 107 may selectively use the cellular communication capabilities of the UE 106B to conduct its cellular communications. The limitation on communication abilities of the wearable device 107 can be permanent, e.g., due to limitations in output power or the radio access technologies (RATs) supported, or temporary, e.g., due to conditions such as current battery status, inability to access a network, or poor reception.

Figure 2:
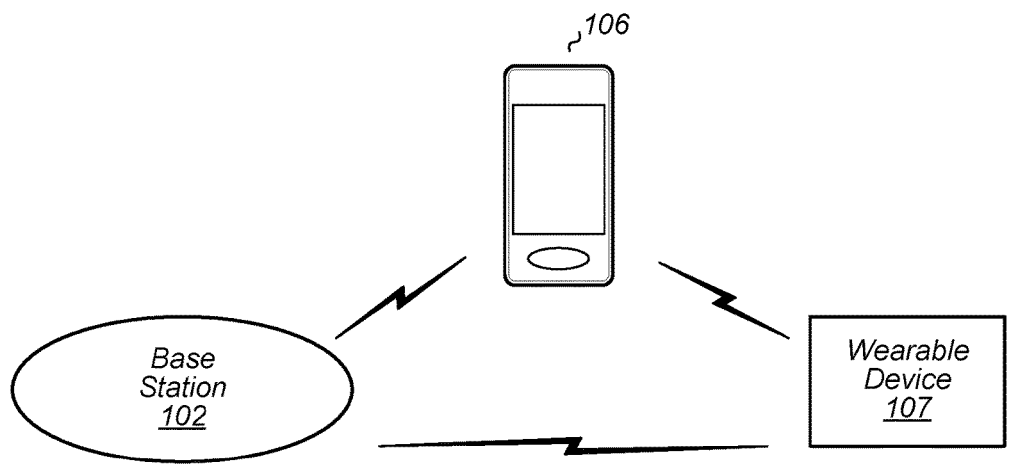
FIG. 2 illustrates an example system in which a wearable device can selectively either directly communicate with a cellular base station or utilize the cellular capabilities of an intermediate or proxy device such as a smart phone, according to some embodiments.

FIG. 2—Example System with a Wearable Device

FIG. 2 illustrates an example small form factor device 107 in communication with base station 102. The small form factor device 107 may be a wearable device such as a smart watch. The wearable device 107 may comprise cellular communication capability and be capable of directly communicating with the base station 102 as shown. When the wearable device 107 is configured to directly communicate with the base station, the wearable device may be said to be in "autonomous mode."

The wearable device 107 may also be capable of communicating with another device (e.g., UE 106), referred to as a proxy device or intermediate device, using a short-range communications protocol, and may then use the cellular functionality of this proxy device for communicating cellular voice/data with the base station 102. In other words, the wearable device 107 may provide voice/data packets intended for the base station 102 over the short-range link to the UE 106, and the UE 106 may use its cellular functionality to transmit (or relay) this voice/data to the base station on behalf of the wearable device 107. Similarly, the voice/data packets transmitted by the base station and intended for the wearable device 107 may be received by the cellular functionality of the UE 106 and then may be relayed over the short-range link to the wearable device. As noted above, the UE 106 may be a mobile phone, a tablet, or any other type of hand-held device, a media player, a computer, a laptop or virtually any type of wireless device. When the wearable device 107 is configured to indirectly communicate with the base station using the cellular functionality of an intermediate or proxy device, the wearable device 107 may be said to be in "relay mode."

Various embodiments herein are described with respect to the wearable device 107 selectively using either its own cellular functionality (autonomous mode) to communicate with a base station, or using the cellular functionality of the UE 106 (relay mode) for communications, e.g., for LTE or VoLTE. However, embodiments described herein may also be used with other radio access technologies (RATs), such as to enable the wearable device 107 to selectively using either its own Wi-Fi functionality (autonomous mode) to communicate with a Wi-Fi access point, or use the Wi-Fi functionality of the UE 106 (relay mode) for Wi-Fi communications.

The wearable device 107 may include a processor that is configured to execute program instructions stored in memory. The wearable device 107 may perform any of the method embodiments described herein by executing such stored instructions. Alternatively, or in addition, the wearable device 107 may include a processing element, such as a programmable hardware element such as an FPGA (field-programmable gate array), integrated circuit (IC), or other circuitry, that is configured to perform any of the method embodiments described herein, or any portion of any of the method embodiments described herein.

The wearable device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The small form factor device (e.g., wearable device) 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the wearable device 107 is a smart watch or other type of wearable device. When the UE 106 is capable of being used by the wearable device 107 as a proxy, the UE 106 may be referred to as a companion device to the wearable device 107.

Figure 3:
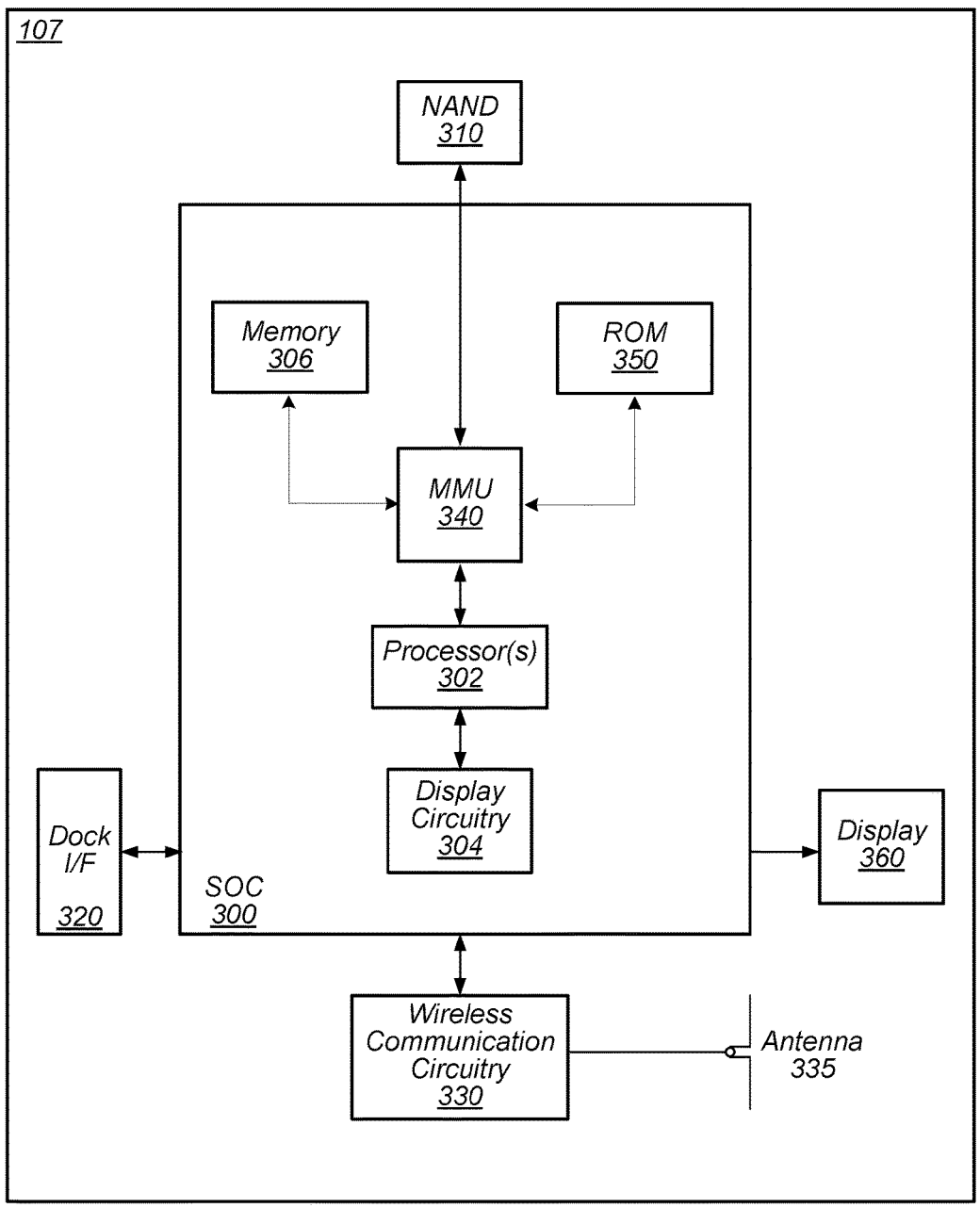
FIG. 3 is a block diagram illustrating an example UE, e.g., a smart phone or wearable device, according to some embodiments.

FIG. 3—Example Block Diagram of a UE Device

FIG. 3 illustrates one possible block diagram of a UE device 106 or a wearable device 107. As shown, the UE 106/107 may include a system on chip (SOC) 300, which may include portions for various purposes. For example, as shown, the SOC 300 may include processor(s) 302 which may execute program instructions for the UE 106/107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read-only memory (ROM) 350, Flash memory 310). The MMU 340 may be configured to perform memory protection and page table translation or setup. In some embodiments, the MMU 340 may be included as a portion of the processor(s) 302.

The UE device 106/107 may also include other circuits or devices, such as the display circuitry 304, radio 330, connector I/F 320, and/or display 360.

In the embodiment shown, ROM 350 may include a bootloader, which may be executed by the processor(s) 302 during bootup or initialization. As also shown, the SOC 300 may be coupled to various other circuits of the UE device 106/107. For example, the UE device 106/107 may include various types of memory, a connector interface 320 (e.g., for coupling to a computer system), the display 360, and wireless communication circuitry (e.g., for communication using LTE, CDMA2000, Bluetooth, WiFi, NFC, GPS, etc.).

The UE device 106/107 may include at least one antenna, and in some embodiments multiple antennas, for performing wireless communication with base stations and/or other devices. For example, the UE device 106/107 may use antenna 335 to perform the wireless communication. As noted above, the UE 106/107 may in some embodiments be configured to communicate wirelessly using a plurality of wireless communication standards or radio access technologies (RATs).

As described herein, the UE device 106 and/or the wearable device 107 may include hardware and software components for implementing methods according to embodiments of this disclosure. The processor 302 of the UE device 106/107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
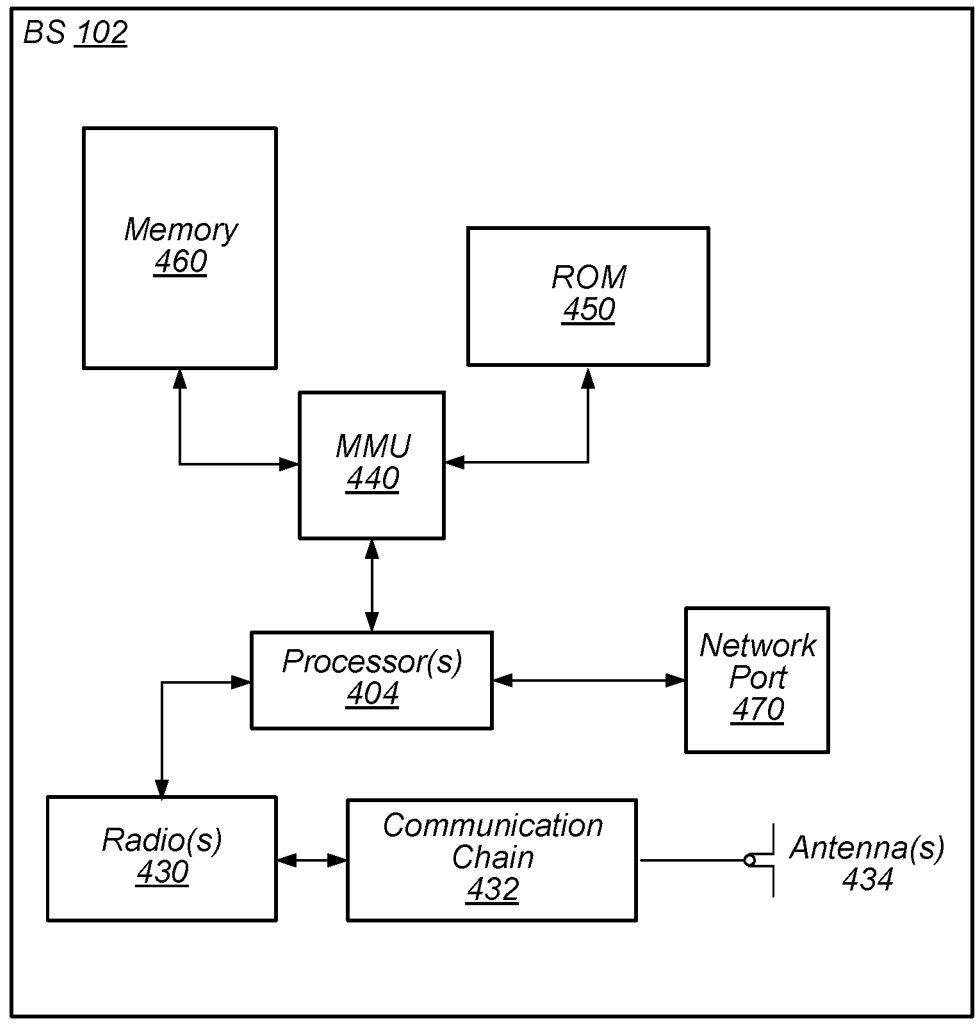
FIG. 4 illustrates an exemplary block diagram of a base station, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The base station 102 may include hardware and software components for implementing or supporting implementation of features described herein.

Context Aware Voice Calls

User equipment (UE) devices are commonly used for performing voice calls with a remote UE device. However, there may be conditions, hereafter considered as voice-to-text conditions, in which a user is unable to effectively communicate via a voice call, or where it would be undesirable for the user to engage in a voice call. For example, the user may be in a noisy environment such as a concert, sports venue, a marketplace, a train station, or another area where ambient noise may limit effective voice call communication. As another example, the user may be in a conference room, classroom, church, hospital, or another area where it would be disruptive for the user to engage in a voice call. As yet another example, the user may be in an emergency situation where it is unsafe to place a traditional voice call. For example, the user may be hiding in his/her home from a burglar, and wish to silently contact an emergency assistance service such as 911. As yet another example, wearable devices are now capable of engaging in voice calls. Some wearable devices are configured to perform voice calls through a headset. However, in the absence of a connected headset the wearable device may be configured to broadcast audio to its wearer (user) to an extent such that nearby people may be able to eavesdrop on the call. In this case, a user may prefer to not engage in a voice call if the user is in a public place (e.g., mall, office, etc.), and/or if the user does not have a headset currently connected to the device. As yet another example, a hearing or speech impaired user may desire to use a UE to communicate with a remote device. The user may be unable to effectively hear incoming voice data, and/or may be unable to effectively input outgoing voice data, rendering a traditional voice call ineffective or impossible.

The user experience may be improved if the UE is configured to automatically detect whether one or more voice-to-text conditions are currently present upon notification of an incoming voice call. If one or more voice-to-text conditions are detected, it may be desirable for the UE to automatically enter a voice-to-text mode wherein the UE would engage the incoming voice call via text messaging. Engaging an incoming voice call via text messaging may comprise converting incoming voice signals into text and displaying the text on a display of the UE. Additionally or alternatively, engaging an incoming call via text messaging may comprise the UE receiving user input as text messages, which are then converted by the UE into audio voice data and transmitted as voice signals to the remote device.

Alternatively, instead of automatically entering voice-to-text mode, the UE may be configured to present an option to the user whether to engage (or answer) an incoming call in voice-to-text mode. For example, the display of the UE may present an icon, such as a button, which, when selected, will answer the call in voice-to-text mode. In some embodiments, the option whether to engage an incoming call in voice-to-text mode may be presented to the user for all incoming calls. In other embodiments, the option whether to engage an incoming call in voice-to-text mode may be presented to the user only for incoming calls during which one or more voice-to-text conditions are determined to be present. Alternatively, in some embodiments, the UE may be configured to always present an option to the user to engage incoming calls in voice-to-text mode, but the option may be made more prominent when one or more voice-to-text conditions are determined to be present. For example, a button displayed on the UE that will trigger voice-to-text mode may be made larger and/or of a different color, shape, etc. when an incoming call is received while one or more voice-to-text conditions are determined to be present. In some embodiments, the UE may be configured to present an option to initiate an outgoing call in voice-to-text mode, based on the presence of one or more voice-to-text conditions. Alternatively, in some embodiments, the UE may be configured to always present an option to initiate an outgoing call in voice-to-text mode.

Figure 5:
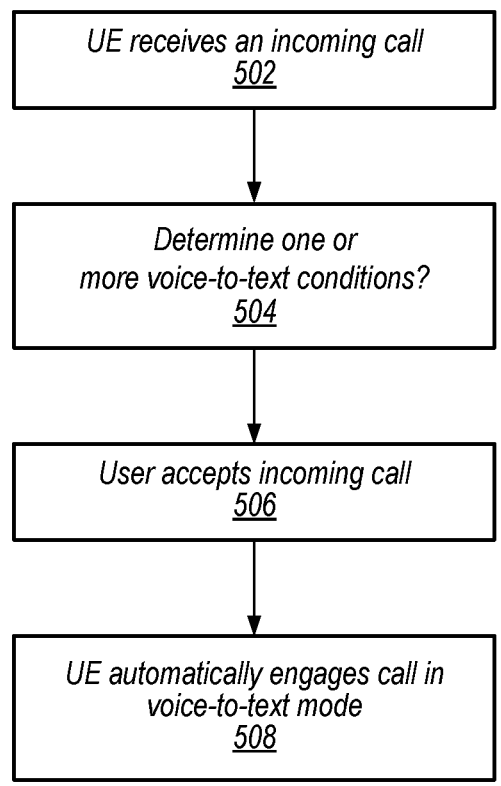
FIG. 5 is a flow diagram illustrating an example operation whereby a UE determines whether to automatically switch to voice-to-text mode upon receipt of an incoming voice call, according to some embodiments.

FIG. 5—Flowchart: Method for Automatically Switching to Voice-to-Text Mode

FIG. 5 illustrates a flowchart diagram of an example method for a wireless device (e.g., UE 106 or a wearable device 107) to determine if one or more voice-to-text conditions are present, and automatically transition into a voice-to-text mode for receiving the incoming call upon determining that one or more voice-to-text conditions are present, according to some embodiments. This method may be particularly useful for a wearable device such as a smart watch, since a smart watch may provide less audio privacy than other larger devices such as smart phones.

The method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a UE receives an incoming call, such as a typical incoming voice call. The indication of the voice call may be via a paging message or other conventional means.

At 504, the UE determines whether one or more voice-to-text conditions are present. These voice-to-text conditions may be any of various types of conditions or criteria, and may involve detection of a single condition or multiple conditions. In some embodiments, the detection of a single voice-to-text condition may be sufficient to automatically engage the voice-to-text mode. In other embodiments, detection of multiple voice-to-text conditions may be required. As one example, the voice-to-text condition may be the presence and/or availability of an auxiliary audio I/O device that allows for more audio privacy, such as a Bluetooth headset or a companion smartphone. Other voice-to-text conditions may include a measurement of ambient noise, location information, user behavior, current battery status, as well as others. These and other voice-to-text conditions are discussed further below.

At 506, the user of the UE elects to accept the incoming call. This may be performed by the user selecting a button on the display of the UE to accept the call. If the UE determines that one or more voice-to-text conditions are present, the UE may automatically engage the call in voice-to-text mode at 508. In other words, the UE may answer the call and invoke a voice-to-text mode such that incoming voice signals are automatically converted into text (such as a text message) for the user to read, and/or such that the UE receives user input as text messages, which are then converted by the UE into audio voice data and transmitted as voice signals to the remote device. If the UE determines that the one or more voice-to-text conditions are not present, the UE may automatically answer the call in a traditional manner (not shown).

Figure 6:
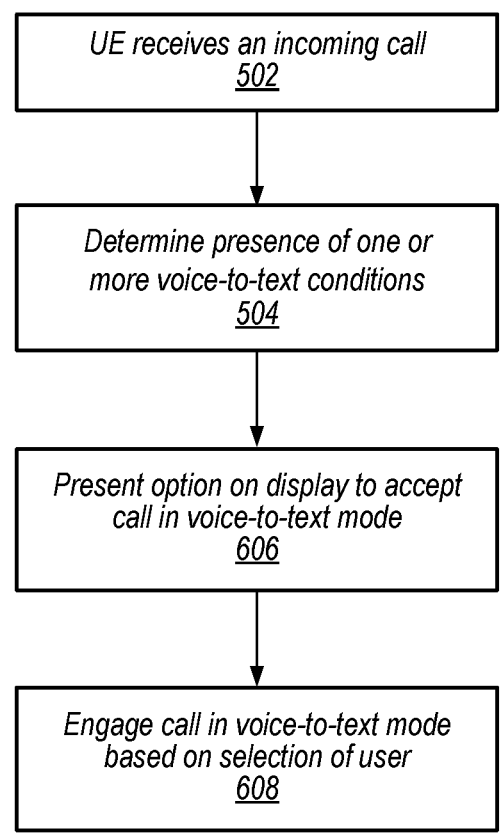
FIG. 6 is a flow diagram illustrating an example operation whereby a UE manually switches to voice-to-text mode upon receipt of an incoming voice call, according to some embodiments.

FIG. 6—Flowchart: Method for Manually Switching to Voice-to-Text Mode

FIG. 6 illustrates a flowchart diagram of an example method for a wireless device (e.g., UE 106 or a wearable device 107) to determine if one or more voice-to-text conditions are present, and then present an option selectable by the user to manually transition into a voice-to-text mode for receiving the incoming call upon determining that one or more voice-to-text conditions are present, according to some embodiments. In FIG. 6, method steps that are identical those performed in FIG. 5 have the same reference numerals for convenience. The method shown in FIG. 6 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502, a UE receives an incoming call, as discussed above.

At 504 the UE determines whether one or more voice-to-text conditions are present, similar to as described above. Here it is noted that the voice-to-text conditions that are assessed in the manual switching method may be less stringent (or more liberal), since the result of this step is merely presenting the option to the user to invoke voice-to-text mode (or making the option more prominent on the display). In the automatic method of FIG. 5, where the determination of voice-to-text conditions results in automatic engagement of the voice-to-text mode, the assessment or determination of the conditions may be more stringent, since the automatic engagement of voice-to-text mode is a more intrusive or potentially disruptive operation.

At 606, the UE presents an option on the display of the UE to accept the call in voice-to-text mode, based on determining that one or more voice-to-text conditions are present. In other words, if the UE determines that one or more voice-to-text conditions are present, the UE may then cause an icon to be displayed on the display, such as near the typical "answer call" button, which is selectable by the user to engage the voice-to-text mode. For example, the icon may be a button or other icon which includes the phrase "Answer in Voice-to-Text Mode" or something similar.

At 608, the UE engages the call in voice-to-text mode based on the user selection of the option to accept the call in voice-to-text mode. If the user chooses to instead answer the incoming voice call in the normal manner, such as selecting or pressing the normal "Answer" button, then the voice call is engaged in a normal manner wherein incoming voice signals to the UE are presented to the user as audible voice signals, as would occur in a normal phone call.

Voice-to-Text Conditions

A variety of situations may lead to a determination that a voice-to-text condition is present, as detailed below.

In some embodiments, the UE may be configured to make an ambient noise measurement using its microphone upon receipt of an incoming call (e.g., upon receipt of a paging message). If upon receipt of an incoming voice call the ambient noise measurement detects the presence of ambient noise above a noise threshold, the UE may be configured to determine that a voice-to-text condition is present. In some embodiments, the ambient noise measurement may pay particular attention to measured audio frequencies that might interfere with output of audible speech frequencies. In another embodiment, the UE may periodically make ambient noise measurements (e.g., at 5 minute intervals or at any other interval), such as when the user has configured a voice-to-text mode option in his settings. In some embodiments, the magnitude of the noise threshold and the length of the interval between measurements may be user configured, as desired. The UE may be alternatively configured to require multiple of the most recent subsequent ambient noise measurements to register above the noise threshold before a voice-to-text condition is determined to be present. Periodically conducting ambient noise measurements may require an undesirable amount of battery power, and thus in some embodiments are only performed when the user configures this option in his device settings, such as when the user knows he is going to a loud venue. As noted above, the UE may be configured to make an ambient noise measurement only upon receipt of an incoming voice call, thus preserving battery life.

In other embodiments, the UE may be configured to determine that a voice-to-text condition is present based on the location of the UE. The UE may determine its location by communication with any of various positioning satellite technologies (GPS, etc.). In other embodiments, the UE may determine its approximate location by the identity of one or more proximate Wi-Fi access points, e.g., which may include a Wi-Fi access point to which the UE is presently connected.

The UE may be configured to allow the user to designate locations or regions surrounding locations as 'quiet regions', wherein the UE will be configured determine that a voice-to-text condition is present. For example, the UE may be configured to allow the user to designate certain Wi-Fi access points as 'voice-to-text' access points, wherein while connected to these designated Wi-Fi access points the UE will determine that a voice-to-text condition is present. In other embodiments, the locations, regions surrounding locations, and Wi-Fi access points that will trigger a UE to determine that a voice-to-text condition is present may alternatively be designated by a network operator or other entity, as desired. For example, certain venues may designate Wi-Fi access points within their premises as "quiet zones", whereby the relevant Wi-Fi access points are configured with information that directs UE devices (or certain classes of UE devices) that are sufficiently proximate to these access points to automatically engage voice-to-text mode upon receipt of an incoming call. This provides a mechanism for a venue owner or operator, such as a hospital, church, movie theater, library, etc. to enforce a quiet zone within their premises, while still allowing users to receive/conduct incoming phone calls in a textual manner.

In other embodiments, the UE device may be configured to handle 911 or enhanced 911 (e911) emergency calls in an appropriate manner, regardless of whether the user places a 911 voice call as is typically done, or texts a message to 911. The UE may be configured such that if the user texts an emergency message to 911, the UE may be configured to provide the emergency text message to the appropriate authorities, and may also be configured to place a voice call to 911 (dial 911) and perform text-to-voice conversion on the text message and provide the converted voice signals when the 911 call is answered by the authorities. Thus in a situation where the user is in an emergency situation where speaking is undesirable, e.g., the user is hiding from intruders in his home or hiding in a robbery situation, the user is able to text his emergency 911 message, and his emergency text message is sent as a converted voice call to 911.

In other embodiments, the UE may be a wearable device that is configured to perform short-range communication with an input/output (I/O) accessory device (e.g., a wireless headset comprising a microphone and speakers, or another audio I/O accessory device). In some embodiment, the UE may be configured to determine that a voice-to-text condition is present any time that the audio I/O device is not available for use by the UE.

Similarly, the UE may be configured to perform short-range communication with a companion device (e.g., a smart phone). In some embodiments, the UE may be configured to determine that a voice-to-text condition is present any time that the companion device is not proximate to the wearable device. For example, if the user is in a fairly quiet location where strangers are present, such as at a coffee shop, the user may desire to not use the wearable device to conduct a voice call since the wearable device may broadcast the received audio in a manner such that strangers can overhear the conversation. If the user desires a more private conversation, and if the user is in possession of the companion device (smartphone), the user can simply elect to use the companion device (smartphone) to conduct the call. Here the user can place the smartphone to his ear and hence have a more private conversion than is possible with the wearable device.

Thus the UE may determine that a voice-to-text condition is present when the companion device is not usable as a replacement for the wearable device in conducting the voice call, e.g., any time the wearable device is not able to communicate with the companion device, or the companion device is determined to be sufficiently far away from the wearable device such that the companion device cannot be used to conduct an incoming voice call in place of the wearable device. For example, the UE may determine that the companion device is not proximate to the UE based on simple lack of ability to communicate, or based on an RSSI signal strength dropping below a predetermined threshold.

In some embodiments, the determination of whether the companion device is not available or usable as a replacement for the wearable device in conducting a voice call as a voice-to-text condition may be used in conjunction with location information.

Alternatively, in some embodiments, the UE may be configured to determine that a voice-to-text condition is present during a simultaneous occurrence of two or more of: 1) unavailability of an accessory audio I/O device, e.g., unavailability of an audio I/O device such as a headset, 2) non-proximity of the companion smartphone device; 3) the UE is determined to be located in a location or region (or proximate to a Wi-Fi access point) designated by the user or a third party in the manner explained above.; and/or 4) a measurement of the ambient noise indicates that the user is in a location that is sufficiently loud such that conducting a normal voice call will be problematic.

In other embodiments, a UE may determine that a voice-to-text condition is present when a battery level of the UE drops below a predetermined threshold. Engaging in a voice call presents a substantial strain on the battery level of a device, so that engaging calls via text message may prolong a battery life of the UE. Thus, if the battery or power level of the UE drops below a certain threshold, the UE may automatically switch to the voice-to-text mode to save power. Here it is presumed that the additional power required to perform voice-to-text conversion operations is less than the relative power saving incurred in transmitting a text message instead of voice signals.

In a related embodiment, the UE may determine if it is in a poor signal quality environment, such as at the edge of a cell, where a large amount of output power is required to transmit voice signals to a base station. In this case, the UE may detect this condition and automatically switch to voice-to-text mode to save power. Here it is presumed that transmission of a text message to a remote base station consumes less power than transmission of voice signals to the remote base station.

In other embodiments, a UE may be used by a hearing or speech impaired user. In some embodiments, the UE may be a teletypewriter (TTY) device that is configured to communicate with a remote device which may be a TTY or a non-TTY device. In traditional implementations, a message from a non-TTY device to a TTY device may be sent to a relay agent, who may convert an audio message into a text message, and forward the text message to the TTY device. The relay agent may likewise convert a text message received from the TTY device into audio, and forward the audio to the remote device. It may improve the user experience if the TTY device is configured to communicate directly with a remote TTY or non-TTY device, without using a third party relay agent. For example, obviating the necessity of a third party relay agent would provide improved privacy and reduced latency for communication using a TTY device. If the user wishes to engage in a call via the UE with a remote device, it may be desirable for the UE to be configured to automatically convert input data from text to audio and/or output data from audio to text. In these embodiments, the UE may be configured to always engage incoming and outgoing voice calls in voice-to-text mode.

In other embodiments, the user may anticipate an upcoming situation wherein the user would prefer to engage calls in voice-to-text mode. In these embodiments, the UE may be designed where the user may select a voice-to-text configuration option, e.g., in the settings of the UE. For example, in a situation where the user is leaving to attend a rock concert or sporting event, or is going to a movie theater, church, or library, the user may go to his "Settings" and place his phone or smartwatch in "voice-to-text mode for voice calls". In this way, incoming voice calls that arrive while the user is at one of these venues will be received as text messages. When the user returns from the venue, the user can go to his "Settings" and disable the "voice-to-text mode for voice calls", i.e., can return to normal calling mode.

In some instances, the condition or circumstance that necessitated engaging the call via text message may change during the duration of the call. In this case, it may be desirable for the user to switch the voice-to-text call back into a voice call during the call. Alternatively, a condition or circumstance may arise during an active voice call that would make it advantageous to switch the voice call into a voice-to-text mode. In some embodiments, while the call is ongoing, the UE may be configured to allow the user to manually switch between conducting the call as a voice call or conducting the call via text messaging. For example, the display of the UE may display a button by which the user may switch back and forth between the two modes during the call.

Engaging a call via text messaging may introduce significantly larger latency than engaging a call as a voice call. It may therefore be desirable for a UE to inform the calling device (the remote UE device) that the call is being engaged via text messaging. In some embodiments, the UE may be configured to automatically send a preset or prerecorded audio (or text) message to the calling device upon acceptance of an incoming voice call in voice-to-text mode, wherein the preset or prerecorded audio (or text) message informs the calling device that the voice call will be engaged in voice-to-text mode. The user of the calling device would then know to anticipate latency from the UE during the call.

Figure 7:
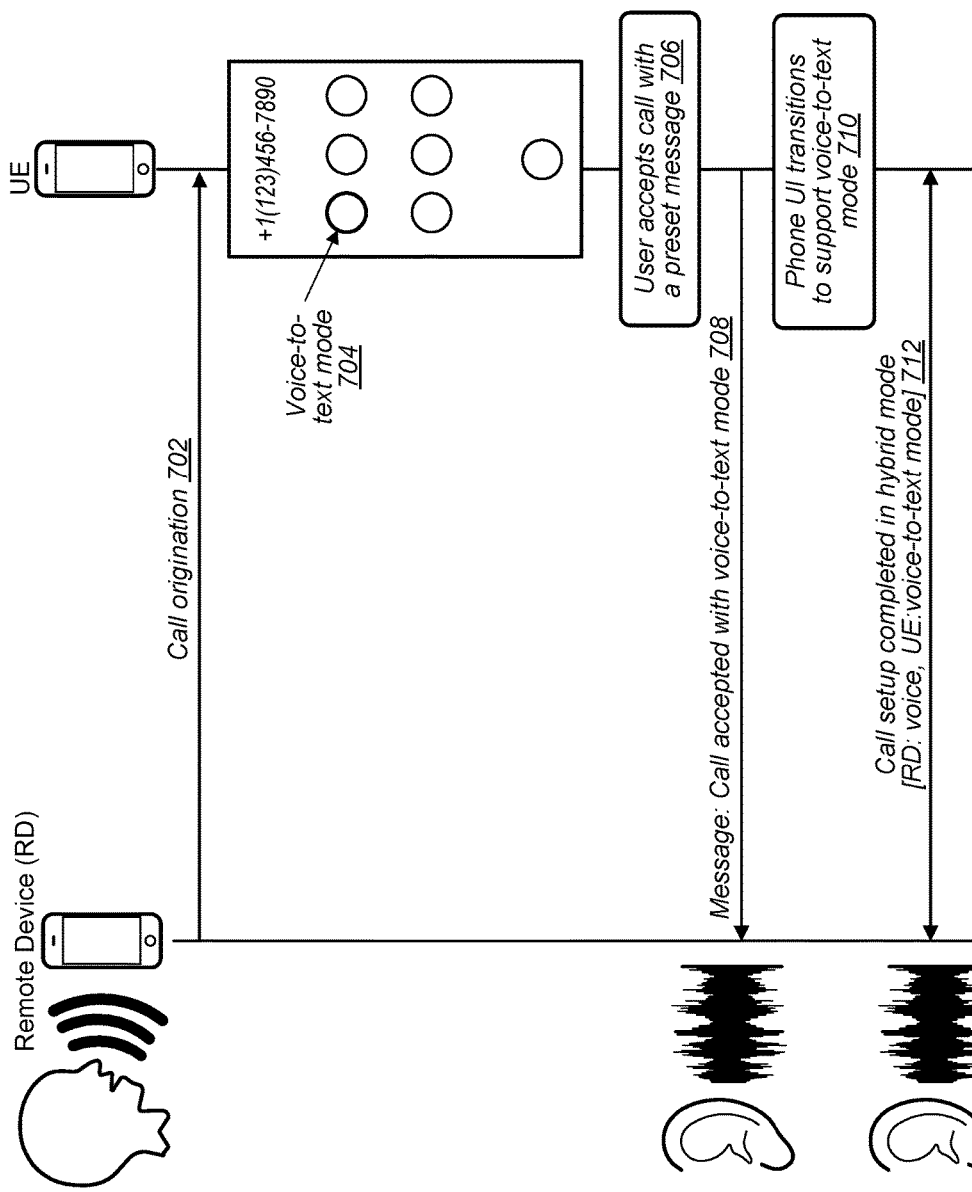
FIG. 7 illustrates an example method whereby a hybrid call is established and the calling device is informed that the receiving device has accepted the call in voice-to-text mode, according to some embodiments.

FIG. 7: Exemplary Method for Engaging an Incoming Call in Voice-to-Text Mode

FIG. 7 shows an exemplary method by which a UE may be configured to receive and engage an incoming call in voice-to-text mode.

At 702, a call is originated by a remote device and an indication of the call is received by the UE. The indication may take the form of a cellular paging message or something similar.

At 704, in response to receipt of the incoming call (in response to receipt of the cellular paging message) a button is displayed on the display of the UE, whereby the user of the UE may select to accept the call in voice-to-text mode. As shown, the button to accept the call in voice-to-text mode may be displayed alongside other buttons, such as a button to accept the voice call as a regular voice call, a button to decline the call or send the call to voicemail, etc.

At 706, the user accepts the call in voice-to-text mode. As noted, the voice-to-text mode may include a preset message, which may be an audio message or a text message, to be conveyed to the calling party (remote party), as discussed below.

At 708, the preset message is communicated from the UE to the remote device, informing the remote device that the UE has accepted the call in voice-to-text mode. Where the preset message is a text message, the present message may be sent as a normal text message. Where the preset message is an audio message, the preset audio message may be communicated as a separate sideband message or as part of the call. If the calling party (remote device) and the called party (the UE) are compatible, e.g., execute the same operating system (OS) or are from the same vendor, or if this functionality has been standardized between different vendors, then the UE may send a data item such as a simple flag or other parameter value to indicate to the remote device that the UE has accepted the call in voice-to-text mode. Receipt of this flag or value by the remote device may cause the remote device to play the appropriate audio message, or display the appropriate text message, informing the user of the remote device that the UE has accepted the call in voice-to-text mode.

At 710, the phone user interface (UI) of the UE transitions to support voice-to-text mode. More specifically, the UE may display a text messaging user interface instead of a voice calling user interface.

Finally, at 712, call setup is completed in a hybrid mode, wherein the remote device engages the call in a voice mode, and the UE engages the call in voice-to-text mode.

Figure 8:
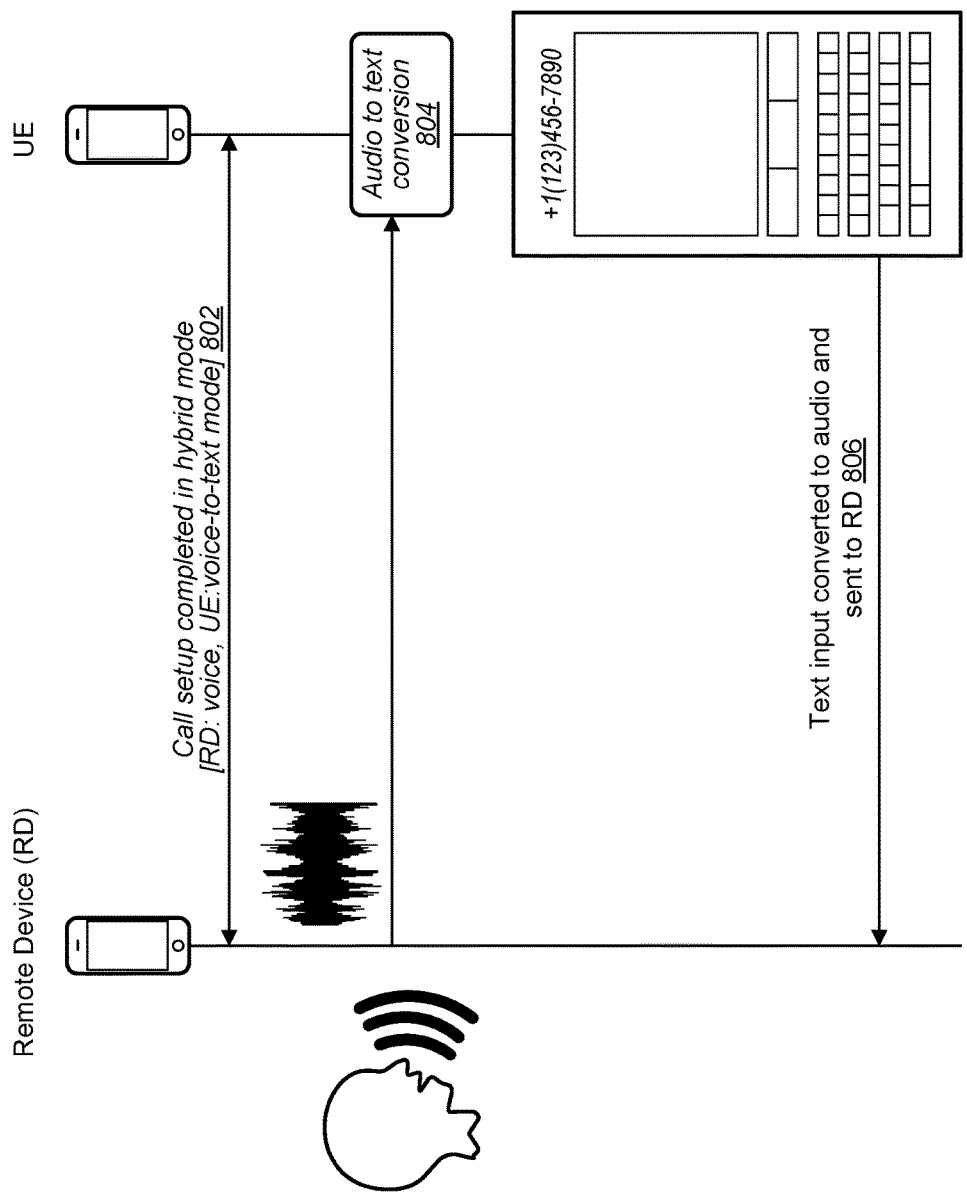
FIG. 8 illustrates an example method whereby a hybrid call is conducted between two devices, according to some embodiments.

FIG. 8: Exemplary Method for Conducting a Call in Hybrid Mode

FIG. 8 shows an exemplary method by which a remote device and a UE may be configured to conduct a call in a hybrid mode. The operations shown in FIG. 8 may occur, for example, at the conclusion of the method detailed in FIG. 7.

At 802, call setup is completed in hybrid mode. Here it is presumed that the operations of FIG. 7 have completed, and the call setup has been performed to establish the call in hybrid mode.

At 804, audio from the remote device is received at the UE, typically through the cellular network, and converted into text by the UE. The UE may execute any of various speech recognition programs to perform the conversion of received audio signals into text.

At 806, text input from the UE is converted into audio and sent to the remote device. In other words, the user may type a text message, or select a preconfigured text message, and this text method may be converted into audio signals for transmission by the UE to the remote device, likely through the cellular network. Where the text message is converted "on-the-fly", then the generated audio may be generated with a computerized voice (e.g., Siri). Alternatively, the user may have prerecorded some audio messages of his own that the user may select to be sent. In this case, no actual conversion of text input to audio output may be needed.

Figure 9:
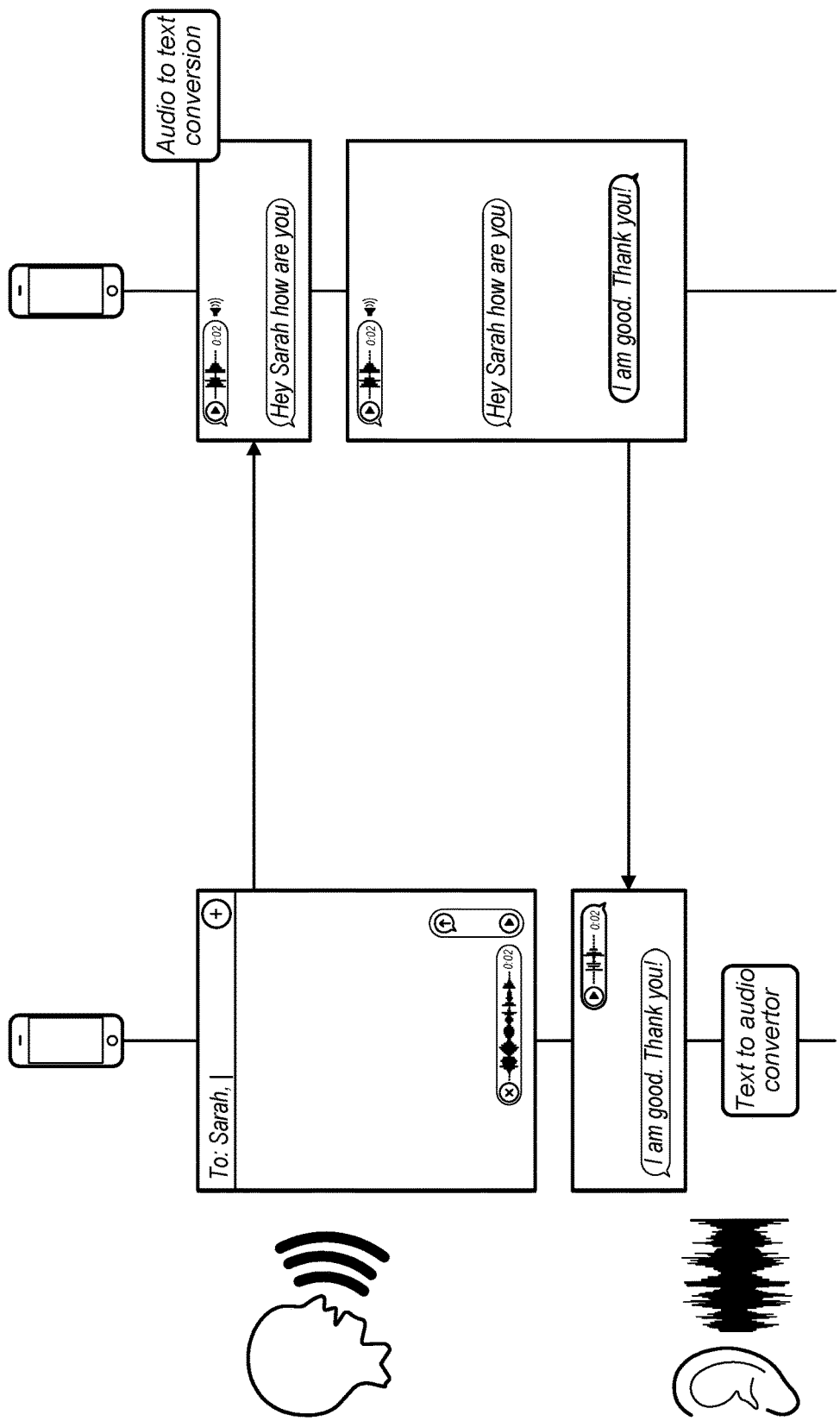
FIG. 9 illustrates an example method whereby a first device communicates an audio message to a second device, and the second device automatically converts the audio message to text, and whereby the second device responds to the first device with a text message and the first device converts the text message to audio.

FIG. 9: Exemplary Method for Conducting Voice-to-Text and Text-to-Voice Mode Between Two UEs FIG. 9 shows an exemplary method by which a first UE and a second UE may be configured to operate in text-to-voice and voice-to-text modes, respectively. A user of the first UE records an audio message that is sent to the second UE. The second UE is configured to display an option to play the audio message, and additionally performs an audio-to-text conversion on the message and displays the content of the message as text. The user of the second UE then inputs a text message response, which is sent to the first UE. The first UE displays the text message response, and additionally may convert the text message response into audio and play back the audio conversion.

Context Aware Text Messaging

In addition to performing voice calls, UE devices are commonly used for communicating text messages and emails with remote devices. However, there are circumstances wherein a user may be unable to effectively communicate via text message or email. For example, the user may be driving so that he/she is unable to (or should not) read and respond via text messaging or email. As another example, the user may be vision impaired and be unable to effectively read text on his/her device. In these circumstances, the user experience may be improved if the UE is configured to enter a text-to-voice mode, wherein the UE may automatically convert an incoming text message or email into audio and/or convert audio input from the user into text that can be sent to the remote device via text message or email while in the text-to-voice mode.

In some embodiments, the UE may be configured to determine whether the user is currently driving an automobile. For example, the UE may be configured to determine its velocity through communication with a positioning satellite technology (GPS, etc.), by the use of accelerometers inside the device, or by other means. If the UE determines that its velocity is above a predetermined threshold, wherein the predetermined threshold is indicative of a user of the UE driving an automobile, the UE may be configured to automatically enter text-to-voice mode. This determination may be used in conjunction with other techniques that help to confirm that the user is currently driving an automobile, such as determining that the location of the UE is consistent with being on a road or highway (and, e.g., not on a train), determining that no other UE devices are in near proximity (no other passengers indicates the user of the UE is driving and not a passenger), or information from the automobile itself, as discussed further below.

In some embodiments, the UE may be configured to determine whether the user is currently driving through short-range wireless communication with a receiver in the automobile. For example, the automobile may be capable of BlueTooth, Wi-Fi, Near Field Communication (NFC), or other short-range wireless communications, and the UE may be configured to enter text-to-voice mode while it is in short-range wireless communication with the automobile. Alternatively, the UE may measure an RSSI signal strength of short-range wireless communication with the automobile to determine whether the UE is sufficiently close to the automobile to likely be located inside the automobile. In other embodiments the UE may be configured to enter text-to-voice mode when the UE is determined to be both moving at a velocity greater than the predetermined threshold and in short-range wireless communication with the automobile.

Automobiles may be equipped with pressure sensors that inform the automobile if a seat is occupied (and hence a seatbelt should be buckled), and the seat occupancy status may be communicated to the UE by the short-range wireless communication with the automobile. In some embodiments, the UE may be configured to enter text-to-voice mode when the UE is determined to be moving at a velocity greater than the predetermined threshold and/or when it is informed through short-range wireless communication with the automobile that the front passenger seat is unoccupied. Alternatively, the UE may be configured to enter text-to-voice mode when the UE is determined to be moving at a velocity greater than the predetermined threshold and/or when it is informed through short-range wireless communication with the automobile that all seats other than the driver's seat are unoccupied.

For privacy reasons, a user may only desire to enter text-to-voice mode if he/she is alone while driving a car. In some embodiments, and in addition to the criteria listed above, a UE, which may be referred to as a first UE, may be additionally configured to determine whether the user is alone while driving an automobile in a variety of ways. For example, the first UE may use proximity information obtained through short-range wireless communication with other UE devices to determine if other UE devices are collocated in the automobile. Alternatively, the first UE may use a cloud based solution. For example, each of a plurality of UEs may update a unique identifier (e.g., VIN number, BT MAC address, etc.) to the cloud and the first UE may query the cloud to determine how many devices are currently being used on the same automobile as the first UE. Alternatively, location information may be used to build a cloud database of UE locations for the plurality of UEs. In other embodiments, the UE may determine the number of persons in an automobile from an "in-car" software platform such as Apple CarPlay. For example, the in-car software platform may broadcast the number of persons in an automobile using a BlueTooth or NFC beacon. Other potential embodiments are also possible, as desired.

In some embodiments, the user may be a vision-impaired user, and the UE may be a TTY device. In traditional implementations, a message from a non-TTY device to a TTY device may be sent to a relay agent, who may convert a text message into an audio message, and forward the audio message to the TTY device. The relay agent may likewise convert an audio message received from the TTY device into text, and forward the text to the remote device. It may improve the user experience if the TTY device is configured to communicate directly with a remote TTY or non-TTY device, without using a third party relay agent. For example, obviating the necessity of a third party relay agent would provide improved privacy and reduced latency for communication using a TTY device. If the user wishes to communicate via the UE with a remote device, it may be desirable for the UE to be configured to automatically convert input audio data into text and/or convert incoming text messages into audio. In these embodiments, the UE may be configured to always engage incoming and outgoing voice calls in text-to-voice mode.

Additional Value-Added Features with Two UEs

In some embodiments, the methods described herein may be supplemented with additional value added features in the instance wherein both the UE device and the remote device are compatible, such as using the same operating system. For example, if both devices are capable of entering voice-to-text and text-to-voice mode, there may be processing efficiencies that would improve the user experience. For example, a UE device, which may be referred to as a first UE, may establish a call with a remote device, wherein the first UE conducts the call in voice-to-text mode, wherein conducting the call in voice-to-text mode comprises converting incoming audio data into text, and converting input text data into outgoing audio data. In these embodiments, the first UE may be further configured to send a message to the remote device upon entering voice-to-text mode, wherein the message informs the remote device of a first operating system running on the first UE. In some embodiments the remote device may be a second UE of the same type as the first UE, wherein the remote device is also running the first operating system and is likewise capable of voice-to-text and text-to-voice modes. In this case, the second UE may then send a message to the first UE, informing the first UE that the second UE is running the first operating system. In these embodiments, processing efficiencies may be made available as detailed below.

For example, in these embodiments, the first and second UEs may enter a hybrid communication mode, wherein the processing requirements of audio-to-text and text-to-audio conversions are distributed equitably between the two UEs. For example, the first UE may transition into a partial voice-to-text mode wherein the first UE converts incoming audio data to text, but does not convert outgoing text data back into audio. The second UE may then be configured to enter a complementary partial text-to-voice mode, wherein the second UE is configured to output audio data, and automatically convert incoming text data into audio data. The processing requirements of audio-to-text and text-to-audio conversion may thereby be split equitably between the two devices, potentially reducing latency and improving user experience. Other potential embodiments involving the first UE engaging in text-to-voice mode, etc., may also be possible, as desired.

FIG. 9: Exemplary Method for Conducting a Hybrid Communication Mode Between Two UEs FIG. 9 shows an exemplary method by which a first UE and a second UE may be configured to operate in a hybrid communication mode. A user of the first UE records an audio message that is sent to the second UE. The second UE is configured to display an option to play the audio message, and additionally performs an audio-to-text conversion on the message and displays the content of the message as text. The user of the second UE then inputs a text message response, which is sent to the first UE. The first UE displays the text message response, and additionally converts the text message response into audio and plays back the audio conversion.

Context Aware Value Added Service

A UE may receive incoming voice and text data that contains information that a user of the UE desires to forward on to an application on the UE. For example, a UE may receive a phone number via a voice or text message, which the user may desire to save into a contact list or address book on the UE. As another example, a UE may receive an indication for an upcoming appointment (e.g., a text message stating that the user has a doctor's appointment at 2 pm today), which the user may desire to save onto a calendar application on the UE. As another example, a user may desire to be reminded of an upcoming event at some point in the future. In these case, it may be desirable for the UE to be configured to provide the option of forwarding the relevant information to the appropriate application.

In some embodiments, the user may wish to remind him/herself of an upcoming appointment. The UE may be configured to receive an audio message from the user, and convert the message into text. The UE may then perform text processing on the text and trigger content based actions based on the content of the text processing. For example, if the recorded message was converted to text as "remind me at 1 pm to get ready for my doctor's appointment", the UE may be configured to wait until 1 pm and then output an automated audio recording that says "get ready for your doctor's appointment". Other embodiments or examples are also possible.

In some embodiments, the user may receive an incoming audio message that contains information which the user would like to forward on to another application on the UE. In these embodiments, the UE may be configured to convert the incoming audio into text, and perform text processing on the converted text to determine if forwarding information to another application on the UE may be warranted. Based on a determination that such forwarding may be warranted, the UE may be configured to display an option on the display of the UE, wherein the user may select the option to forward the information to the recommended application, or the user may alternatively select to ignore the recommendation to forward the information.

In some embodiments, the user may anticipate a need to transcribe upcoming audio data into text and forward the text to a note-taking application on the UE. For example, the user may plan to participate in a conference call, and may desire to automatically take notes during the call. In these embodiments, the UE may be configured to display an option on the display of the UE to enter a 'note-taking' mode, wherein the UE is configured to automatically transcribe audio data into text and forward the text to a predesignated application on the UE during voice calls while in the note-taking mode.

Figure 10:
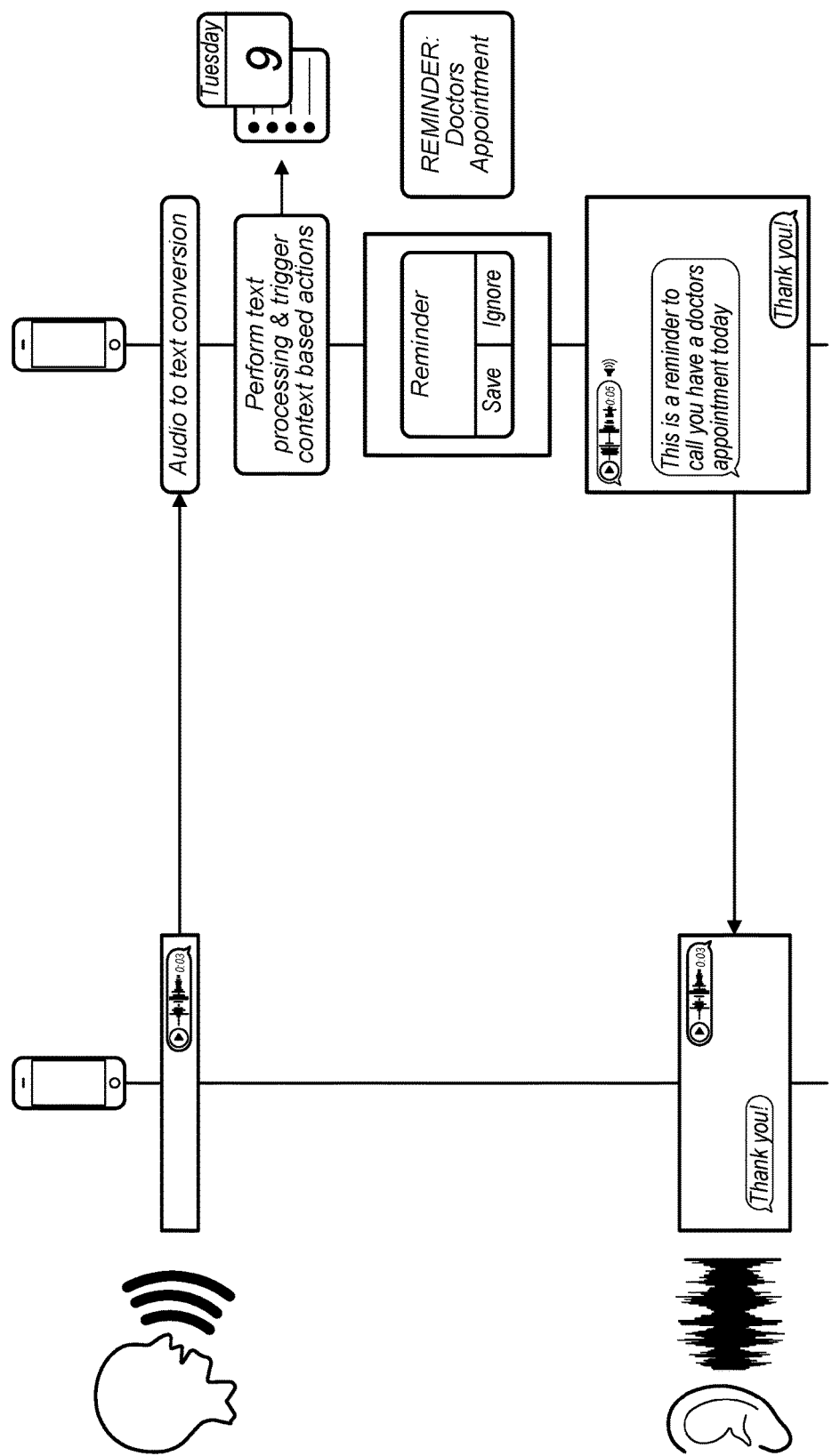
FIG. 10 illustrates an example method whereby data processing and context based value-added actions are performed on a received audio message.

FIG. 10: Exemplary Method for Text Processing and Context Based Value Added Actions FIG. 8 shows an exemplary method by which a UE is configured to perform text processing and trigger context based actions on an incoming audio message. The UE receives an audio message from a remote device. The UE then converts the audio into text. The UE then performs text processing on the converted text and determines whether to trigger context based actions. Based on a determination that the text will trigger a reminder via a calendar app on the UE, the UE then displays an option on the display, whereby the user of the UE may elect either to save the reminder to the calendar, or ignore the reminder. Based on the user elected to save the reminder to the calendar, the UE is further configured to remind the user at a subsequent time of the relevant content of the text.

Locale Based Content Translation

In modern times, many people routinely travel to foreign countries where the native language is unfamiliar. Routine tasks such as booking a hotel, renting a car, or making a restaurant reservation can be made much more difficult if the traveler does not speak the native language. The mobile computing and communication power of wireless electronic devices may be able to significantly alleviate the difficulty associated with communicating in a foreign language, and methods and apparatus for alleviating this difficulty are disclosed herein.

In some embodiments, a UE device may be configured to determine its location. The UE may determine its location by communication with any of various positioning satellite technologies (GPS, etc.). In other embodiments, the UE may determine its approximate location by the identity of the Wi-Fi access point to which the UE is presently connected. The UE may further determine a native language related to the location of the UE, and a preferred language that is selected by the user. For example, if the UE is determined to be located in Japan, the UE may determine Japanese to be the native language for that location. Furthermore, a native English speaker may desire to configure English as the preferred language for the UE. The UE may further be configured to convert incoming audio data (e.g., from a voice call) or an incoming text message from the determined native language into the preferred language. The UE may be additionally or alternatively be configured to convert outgoing audio data (e.g., from a voice call) or an outgoing text message from the preferred language to the native language. These embodiments may facilitate communication with the UE in a region that uses a language that is unfamiliar to the user.

Figure 11:
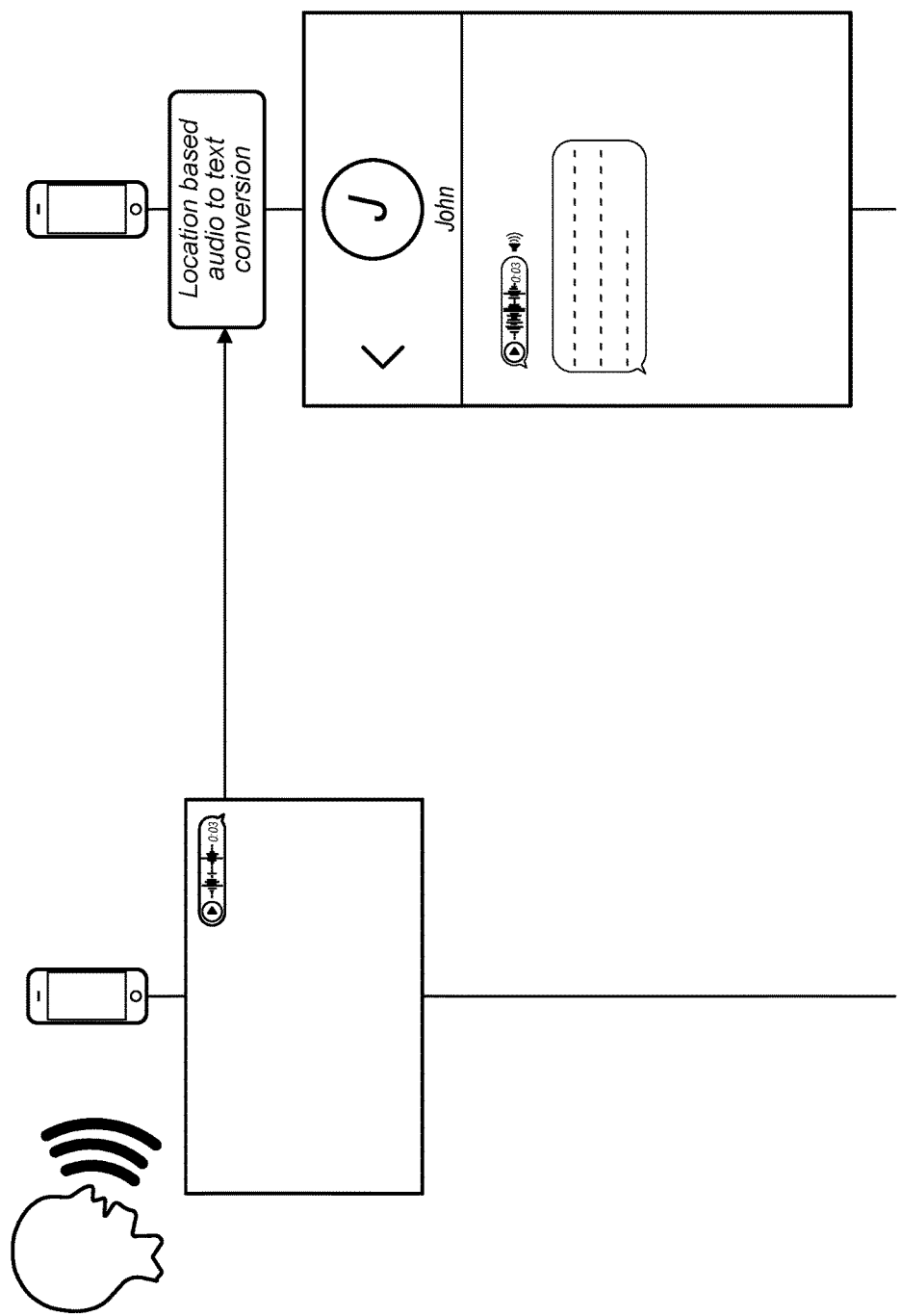
FIG. 11 illustrates an example method whereby incoming audio data is converted into text and translated based on the location of a device.

FIG. 11: Exemplary Method for Performing Location Based Audio to Text Conversion FIG. 11 shows an exemplary method by which UE performs location based audio-to-text conversion on an incoming audio message. An audio message is received at the UE from a remote device. Based on the location of the device, the UE determines a likely native language for the audio message. The UE then converts the audio message into text, wherein the conversion involves a translation of the audio message from the native language into a preferred language determined by the user. An option to playback the audio message and the translated text are then displayed on the display of the UE.

Figure 12:
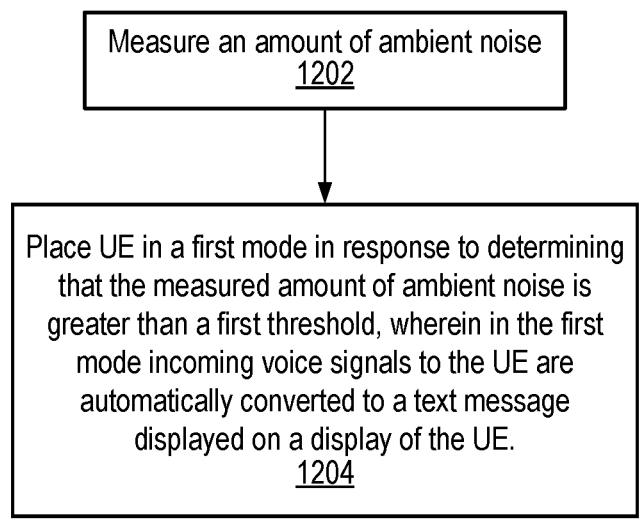
FIG. 12 is a flow chart diagram illustrating an exemplary method for entering a voice-to-text mode based on an ambient noise measurement.

FIG. 12: Flowchart for Entering Voice-to-Text Mode Based on Ambient Noise Measurement FIG. 12 is a flowchart diagram illustrating an exemplary method for UE device to enter a voice-to-text mode based on an ambient noise measurement, according to some embodiments.

At 1202, a UE device may perform a measurement of ambient noise using a microphone of the UE. In various embodiments, this may be performed in response to an incoming voice call, or may be periodically performed, as desired.

At 1204, the UE may be placed in a first mode in response to determining that the measured amount of ambient noise is greater than a first threshold, wherein in the first mode incoming voice signals to the UE are automatically converted to a text message displayed on a display of the UE. The first mode may be referred to as a 'voice-to-text' mode. In some embodiments, the UE may be configured to enter the voice-to-text mode automatically in response to the determination that the ambient noise measurement exceeded the first threshold. In other embodiments, the determination that the ambient noise measurement exceeded the first threshold may cause the UE to display an option which is selectable by a user of the UE to enter the voice-to-text mode, as explained in greater detail above.

The following numbered paragraphs discuss other various embodiments.

In some embodiments, a wearable device is claimed comprising at least one antenna for performing wireless communication, a first radio coupled to the at least one antenna, and one or more processors coupled to the first radio. The first radio may be configured to perform short-range communication with a companion device, and the one or more processors and the first radio may be configured to perform wireless communications using the at least one antenna.

In some embodiments, the wearable device is configured to receive an incoming voice call originating from a remote UE device, determine if the companion device is proximate to the wearable device, and enter a first mode for the incoming voice call after determining that the companion device is not proximate to the wearable device. While in the first mode, incoming voice signals to the wearable device from the incoming call may be automatically converted to a text message displayed on the wearable device.

In some embodiments, after receiving the incoming voice call, the wearable device is configured to present an option on the display that is selectable to enter the first mode, wherein the option to enter the first mode is automatically presented in response to determining that the companion device is not proximate to the wearable device.

In some embodiments, after receiving the incoming voice call, the wearable device is configured to automatically enter the first mode in response to determining that the companion device is not proximate to the wearable device.

In some embodiments, after receiving the incoming voice call, the wearable device is configured to present an icon on the display that is selectable to enter the first mode, wherein a prominence of the icon is increased in response to determining that the companion device is not proximate to the wearable device.

In some embodiments, the companion device is a smart phone.

In some embodiments, the wearable device further comprises a second radio coupled to the at least one antenna, wherein the second radio is configured to perform cellular communication with a base station, and wherein the incoming voice call is received by the second radio from the base station.

In some embodiments, the wearable device is a smart watch.

In some embodiments, in the first mode text messages selected and/or input are automatically converted to outgoing voice signals to the remote UE device.

In some embodiments, during the incoming voice call, the wearable device is configured to present an option on the display that is selectable to exit the first mode, wherein after exiting the first mode incoming voice signals to the UE device are presented as audible voice signals.

In some embodiments, after exiting the first mode automatic conversion of incoming voice signals to the UE device to a text message is no longer performed.

In some embodiments, the first radio is configured to perform short-range communication with an input/output (I/O) accessory device, wherein the wearable device is further configured to determine if the I/O accessory device is available for use with the wearable device, enter the first mode for the incoming voice call after determining that the I/O accessory device is not available for use with the UE device and that the companion device is not proximate to the wearable device.

In some embodiments, the I/O accessory device is a wireless headset comprising a microphone and a speaker.

In some embodiments, after receiving the incoming voice call, the wearable device is configured to present an option on the display that is selectable to enter the first mode, wherein the option to enter the first mode is automatically presented in response to determining that the I/O accessory device is not available for use with the wearable device and that the companion device is not proximate to the wearable device.

In some embodiments, after receiving the incoming voice call, the wearable device is configured to automatically enter the first mode in response to determining that the I/O accessory device is not available for use with the wearable device and that the companion device is not proximate to the wearable device.

In some embodiments, a wearable device is claimed comprising at least one antenna for performing wireless communication; a first radio coupled to the at least one antenna, wherein the first radio is configured to perform short-range communication with a companion device; and one or more processors coupled to the first radio, wherein the one or more processors and the first radio are configured to perform wireless communications using the at least one antenna.

In some embodiments, the wearable device is configured to receive an incoming voice call originating from a remote UE device; automatically determine if the companion device is proximate to the wearable device in response to receiving the incoming voice call; and automatically place the wearable device in a first mode for the incoming voice call in response to determining that the companion device is not proximate to the wearable device, wherein in the first mode incoming voice signals to the wearable device from the incoming call are automatically converted to a text message displayed on the wearable device.

In some embodiments, the automatic placement of the wearable device in the first mode is performed without manual user input selecting the first mode.

In some embodiments, a non-transitory computer readable memory medium is claimed comprising program instructions, wherein the memory medium is comprised within a wearable device. The program instructions may be executable to receive an incoming voice call originating from a remote UE device; determine if a companion device is proximate to the wearable device; and enter a first mode for the incoming voice call after determining that the companion device is not proximate to the wearable device, wherein in the first mode incoming voice signals to the wearable device from the incoming call are automatically converted to a text message displayed on the wearable device.

In some embodiments, the program instructions are further executable to: after receiving the incoming voice call, present an option on the display that is selectable to enter the first mode, wherein the option to enter the first mode is automatically presented in response to determining that the companion device is not proximate to the wearable device.

In some embodiments, a user equipment (UE) device is claimed comprising: at least one antenna for performing wireless communication; a first radio coupled to the at least one antenna, wherein the first radio is configured to perform cellular communication with a base station; a second radio coupled to the at least one antenna, wherein the second radio is configured to perform short-range communication with an input/output (I/O) accessory device; and one or more processors coupled to the first and second radios, wherein the one or more processors and the first and second radios are configured to perform wireless communications using the at least one antenna.

The UE device may be configured to: receive an incoming voice call from a remote UE device; automatically determine if the I/O accessory device is available for use with the UE device; and enter a first mode for the incoming call after determining that the I/O accessory device is not available for use with the UE device, wherein in the first mode incoming voice signals to the UE device are automatically converted to a text message displayed to the user.

In some embodiments, the UE device is configured to present an option on the display that is selectable to enter the first mode, wherein the option to enter the first mode is automatically presented in response to determining that the I/O accessory device is not available for use with the UE device.

In some embodiments, the UE device is configured to automatically enter the first mode in response to determining that the I/O accessory device is not available for use with the UE device.

In some embodiments, after receiving the incoming voice call, the wearable device is configured to present an icon on the display that is selectable to enter the first mode, wherein a size of the icon is increased in response to determining that the I/O accessory device is not available for use with the UE device.

In some embodiments, the I/O accessory device is a wireless headset comprising a microphone and a speaker.

In some embodiments, the UE device is a wearable device.

In some embodiments, the UE device is a smart watch.

In some embodiments, the UE device is a wearable device that is configured to utilize a companion device for certain functionality. In these embodiments, the UE device is further configured to: determine if the companion device is proximate to the UE device; and enter the first mode for the incoming call after determining that the I/O accessory device is not available for use with the UE device and the companion device is not proximate to the UE device.

In some embodiments, the UE device is configured to present an option on the display that is selectable to enter the first mode, wherein the option to enter the first mode is automatically presented in response to determining that the I/O accessory device is not available for use with the UE device and the companion device is not proximate to the UE device.

In some embodiments, the UE device is configured to automatically enter the first mode in response to determining that the I/O accessory device is not available for use with the UE device and the companion device is not proximate to the UE device.

In some embodiments, the companion device is a smart phone.

In some embodiments, during the incoming voice call the UE device is configured to present an option on the display that is selectable to exit the first mode, wherein after exiting the first mode incoming voice signals to the UE device are presented as audible voice signals and automatic conversion of incoming voice signals to the UE device to a text message is no longer performed.

In some embodiments, in the first mode text messages selected and/or input are automatically converted to outgoing voice signals to the remote UE device.

In some embodiments, a user equipment (UE) device is claimed comprising: at least one antenna for performing wireless communication; a first radio coupled to the at least one antenna, wherein the first radio is configured to perform cellular communication with a base station; a second radio coupled to the at least one antenna, wherein the second radio is configured to perform short-range communication with an input/output (I/O) accessory device; and one or more processors coupled to the first and second radios, wherein the one or more processors and the first and second radios are configured to perform wireless communications using the at least one antenna. In these embodiments, the UE device is configured to: receive an incoming voice call from a remote UE device; determine if the I/O accessory device is available for use with the UE device in response to receiving the incoming voice call; automatically place the UE device in a first mode for the incoming call in response to determining that the I/O accessory device is not available for use with the UE device, wherein in the first mode incoming voice signals to the UE device are automatically converted to a text message displayed on a display of the UE device; and wherein the automatic placement of the UE device in the first mode is performed without manual user input selecting the first mode.

In some embodiments, the UE device is a wearable device that is configured to utilize a companion device for certain functionality; wherein the UE device is further configured to: determine if the companion device is proximate to the UE device; and wherein the UE device is configured to automatically place the UE device in the first mode for the incoming call in response to determining that the I/O accessory device is not available for use with the UE device and the companion device is not proximate to the UE device.

In some embodiments, a wearable device is claimed comprising: at least one antenna for performing wireless communication; a first radio coupled to the at least one antenna, wherein the first radio is configured to perform short-range communication with a companion device; and one or more processors coupled to the first radio, wherein the one or more processors and the first radio are configured to perform wireless communications using the at least one antenna. In these embodiments, the wearable device is configured to: receive an incoming voice call originating from a remote UE device; determine if a short range wireless device is proximate to the wearable device, wherein the short range wireless device provide supplemental microphone and speaker capabilities for the wearable device; and enter a first mode for the incoming voice call after determining that the short range wireless device is not proximate to the wearable device, wherein in the first mode incoming voice signals to the wearable device from the incoming call are automatically converted to a text message displayed on the wearable device.

In some embodiments, the short range wireless device is a Bluetooth headset.

In some embodiments, the short range wireless device is a smart phone acting as a companion device to the wearable device.

In some embodiments, a user equipment (UE) device is claimed comprising: at least one antenna for performing wireless communication; at least one radio coupled to the at least one antenna, wherein the at least one radio is configured to perform cellular communication with a base station; and one or more processors coupled to the at least one radio, wherein the one or more processors and the at least one radio are configured to perform wireless communications using the at least one antenna.

In these embodiments, the UE device is configured to: receive an incoming voice call from a remote UE device; place the UE in a first mode for the incoming call, wherein in the first mode incoming voice signals to the UE are automatically converted to a text message displayed on a display of the UE device; after the incoming call has been answered in the first mode, during the voice call: present an option on the display that is selectable to exit the first mode; receive input selecting the option to exit the first mode; and exit the first mode and return to a normal call mode in response to the input selecting the option to exit the first mode, wherein in the normal call mode incoming voice signals to the UE device are presented as audible voice signals and automatic conversion of incoming voice signals to the UE device to a text message is no longer performed.

In some embodiments, in the first mode, text messages selected and/or input are automatically converted to outgoing voice signals to the remote UE.

In some embodiments, in the normal call mode, text messages selected and/or input are not automatically converted to outgoing voice signals to the remote UE.

In some embodiments, after exiting the first mode and returning to the normal call mode, during the incoming call, the UE device is further configured to: present an option on the display that is selectable to return to the first mode; receive input selecting the option to return to the first mode; and exit the normal call mode and return to the first mode in response to the input selecting the option to return to the first mode.

In some embodiments, a wearable device is claimed comprising: at least one antenna for performing wireless communication; a first radio coupled to the at least one antenna, wherein the first radio is configured to perform short-range communication with a companion device; and one or more processors coupled to the first radio, wherein the one or more processors and the first radio are configured to perform wireless communications using the at least one antenna.

In these embodiments, the wearable device is configured to: receive an incoming voice call originating from a remote UE device; after receiving the incoming voice call, determine one or more criteria for establishing a voice-to-text mode for the incoming call; and after receiving the incoming voice call, present an icon on the display that is selectable to enter the first mode, wherein a size of the icon is increased in response to determining one or more criteria for establishing a voice-to-text mode for the incoming call.

In some embodiments, the size of the icon is correspondingly increased based on a number of the criteria determined for establishing the voice-to-text mode for the incoming call, wherein a greater number of identified criteria results in a correspondingly greater size of the icon.

In some embodiments, the size of the icon is correspondingly increased based on a type of the criteria determined for establishing the voice-to-text mode for the incoming call.

In some embodiments, the size of the icon is correspondingly increased based on a number and type of the criteria determined for establishing the voice-to-text mode for the incoming call.

In some embodiments, in the criteria include two or more of: 1) proximity of a companion device; 2) availability of an audio input/output (I/O) device; 3) location; and 4) ambient noise measurement.

In some embodiments, a user electronics (UE) device is claimed comprising: at least one antenna for performing wireless communication; at least one radio coupled to the at least one antenna, wherein the first radio is configured to perform cellular communication with a base station; and one or more processors coupled to the at least one radio, wherein the one or more processors and the at least one radio are configured to perform wireless communications using the at least one antenna.

In these embodiments, the UE device is configured to: automatically determine if the UE device is in a driving scenario; automatically place the UE device in a first mode in response to determining that the UE device is in the driving scenario, wherein in the first mode incoming text messages to the UE device are automatically converted to a voice message presented audibly to the user; and the automatic placement of the UE device in the first mode is performed without manual user input selecting the first mode.

In some embodiments, automatically determining if the UE device is in a driving scenario is based at least in part on a determined velocity of the UE device In some embodiments, in the first mode incoming email messages to the UE device are automatically converted to a voice message presented audibly.

In some embodiments, automatically determining if the UE device is in a driving scenario comprises automatically determining if the UE device is moving at a velocity greater than a threshold indicative of a user of the UE device driving an automobile.

In some embodiments, automatically determining if the UE device is in a driving scenario comprises automatically determining if the UE device is moving at a velocity greater than a threshold indicative of a user of the UE device driving an automobile and automatically determining that the user is in a driver's seat of an automobile.

In some embodiments, a user electronics (UE) device is claimed comprising: at least one antenna for performing wireless communication; at least one radio coupled to the at least one antenna, wherein the first radio is configured to perform cellular communication with a base station; and one or more processors coupled to the at least one radio, wherein the one or more processors and the at least one radio are configured to perform wireless communications using the at least one antenna; and a memory which stores an operating system of a first type, wherein the operating system of the first type is executed by the one or more processors.

In these embodiments the UE device is configured to: receive an incoming voice call from a remote UE device; enter a first mode of operation of the UE device, wherein in the first mode of operation the incoming voice call is converted to a text message presented on a display of the UE; automatically determine if the remote UE device is executing the operating system of the first type; and automatically transmit a first message to the remote in response to automatically determining that the remote UE device is executing the operating system of the first type, wherein the first message indicates to the remote UE device that the UE device has entered the first mode of operation.

In some embodiments, the first message indicates to the remote UE device that the remote UE device may experience delays in receiving responses from the UE device, due to the UE device being in the first mode of operation.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user electronics device (UE), comprising:
 at least one antenna for performing wireless communication;
 at least one radio coupled to the at least one antenna, wherein the at least one radio is configured to perform cellular communication with a base station;
 one or more processors coupled to the at least one radio, wherein the one or more processors and the at least one radio are configured to perform wireless communications using the at least one antenna; and
 a microphone;
 wherein the UE is configured to:
  measure an amount of ambient noise received by the microphone of the UE;
  in response to receiving an incoming voice call, present an icon on the display that is selectable to enter a voice-to-text mode, wherein the icon is made more prominent in response to determining that the amount of ambient noise received by the microphone of the UE is greater than the first threshold, and wherein in the voice-to-text mode incoming voice signals to the UE are automatically converted to a text message displayed on a display of the UE.

2. The UE of claim 1,
 wherein the first threshold is set to an audio level such that there is difficulty understanding speech when ambient noise in a location of the UE is above the first threshold.

3. The UE of claim 1,
 wherein the UE is a wearable device.

4. The UE of claim 1,
 wherein the UE is configured to measure the amount of ambient noise received by the microphone of the UE in response to receipt of the incoming voice call.

5. The UE of claim 1,
 wherein the UE is further configured to automatically determine a location of the UE;
 wherein the UE is further configured to automatically place itself in the voice-to-text mode in response to determining that the amount of ambient noise received by the microphone of the UE is greater than the first threshold and that UE is in a first location.

6. The UE of claim 1,
 wherein input text messages are automatically converted into outgoing voice signals while engaging a voice call while in the voice-to-text mode.

7. The UE of claim 1,
 wherein the UE is further configured to:
  make ambient noise measurements at periodic intervals,
  place the UE in the voice-to-text mode in response to multiple consecutive ones of most recent ambient noise measurements exceeding the first threshold.

8. The UE of claim 1,
 wherein making the icon more prominent comprises increasing a size of the icon.

9. The UE of claim 1,
 wherein making the icon more prominent comprises altering at least one of a color and shape of the icon.

10. A method performed by a user electronics device (UE), the method comprising:
 measuring an amount of ambient noise received by a microphone of the UE;
 in response to receiving an incoming voice call, presenting an icon on the display that is selectable to enter a voice-to-text mode, wherein the icon is made more prominent in response to determining that the amount of ambient noise received by the microphone of the UE is greater than a first threshold,
 wherein in the voice-to-text mode incoming voice signals to the UE are automatically converted to a text message displayed on a display of the UE.

11. The method of claim 10,
 wherein said measuring the amount of ambient noise is performed in response to receipt of the incoming voice call.

12. The method of claim 10,
 wherein input text messages are automatically converted into outgoing voice signals while engaging a voice call while in the voice-to-text mode.

13. The method of claim 10,
 wherein making the icon more prominent comprises increasing a size of the icon.

14. The method of claim 10,
 wherein making the icon more prominent comprises altering at least one of a color and shape of the icon.

15. A non-transitory computer-readable memory medium that stores program instructions that, when executed by a wireless user equipment device (UE), cause the UE to:
 perform an ambient noise measurement using a microphone of the UE;
 in response to receiving an incoming voice call, present an icon on the display that is selectable to enter a voice-to-text mode, wherein the icon is made more prominent in response to determining that an amount of ambient noise received by the microphone of the UE is greater than the first threshold, and wherein in the voice-to-text mode incoming voice signals to the UE are automatically converted to a text message displayed on a display of the UE.

16. The memory medium of claim 15, wherein the program instructions are further executable to cause the UE to:
perform the ambient noise measurement using the microphone of the UE in response to receipt of the incoming voice call.

17. The memory medium of claim 15, wherein the ambient noise measurement preferentially measures audio frequencies that are likely to interfere with audible speech frequencies.

18. The memory medium of claim 15, wherein the first threshold is user-configurable.

19. The memory medium of claim 15, wherein the program instructions are further executable to cause the UE to:
present an option on the display that is selectable to exit the voice-to-text mode during the voice call;
wherein after exiting the voice-to-text mode incoming voice signals to the UE are presented as audible voice signals to the user and automatic conversion of incoming voice signals to the UE to a text message is no longer performed.

20. The memory medium of claim 15,
wherein making the icon more prominent comprises one or more of:
increasing a size of the icon,
altering a shape of the icon, and
altering a color of the icon.

* * * * *